US012700403B2

(12) United States Patent
Jiang

(10) Patent No.: US 12,700,403 B2
(45) Date of Patent: Aug. 4, 2026

(54) METHOD, APPARATUS, ELECTRONIC DEVICE AND STORAGE MEDIUM FOR TEXT CONTENT MATCHING

(71) Applicant: Beijing Zitiao Network Technology Co., Ltd., Beijing (CN)

(72) Inventor: Yongsen Jiang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 219 days.

(21) Appl. No.: 18/687,753

(22) PCT Filed: Aug. 9, 2022

(86) PCT No.: PCT/CN2022/111140
§ 371 (c)(1),
(2) Date: Feb. 28, 2024

(87) PCT Pub. No.: WO2023/029904
PCT Pub. Date: Mar. 9, 2023

(65) Prior Publication Data
US 2024/0428784 A1     Dec. 26, 2024

(30) Foreign Application Priority Data
Aug. 31, 2021     (CN) .......................... 202111016289.2

(51) Int. Cl.
*G10L 15/197*          (2013.01)
*G10L 15/02*           (2006.01)
(Continued)

(52) U.S. Cl.
CPC ............ *G10L 15/197* (2013.01); *G10L 15/02* (2013.01); *G10L 15/22* (2013.01); *G10L 2015/088* (2013.01)

(58) Field of Classification Search
None
See application file for complete search history.

(56) References Cited

U.S. PATENT DOCUMENTS 6,226,615 B1 * 5/2001 Kirby ................... H04N 5/2222
                                                  704/275
6,272,461 B1 * 8/2001 Meredith ................ G10L 21/06
                                                  704/235

(Continued)

FOREIGN PATENT DOCUMENTS

CN          104796584 A      7/2015
CN          106910504 A      6/2017
(Continued)

OTHER PUBLICATIONS

International Patent Application No. PCT/CN2022/111140; Int'l Search Report; dated Nov. 11, 2022; 3 pages.
(Continued)

*Primary Examiner* — Jonathan C Kim
(74) *Attorney, Agent, or Firm* — BakerHostetler

(57) ABSTRACT

Embodiments of the present disclosure provide a method, apparatus, electronic device, and storage medium for text content matching. The method of text content matching includes: in accordance with a collection of to-be-processed speech information, determining a to-be-processed acoustic feature corresponding to the to-be-processed speech information (S110); processing, based on an audio following method, the to-be-processed acoustic feature to obtain a to-be-matched utterance corresponding to the to-be-processed acoustic feature (S120); and determining a target utterance associated with the to-be-matched utterance in target text and differentiating a display of the target utterance in the target text (S130).

20 Claims, 2 Drawing Sheets

(51) Int. Cl.
G10L 15/08 (2006.01)
G10L 15/22 (2006.01)

(56) References Cited

U.S. PATENT DOCUMENTS

| | | | | |
|---|---|---|---|---|
| 7,228,275 | B1 * | 6/2007 | Endo | G10L 15/32 |
| | | | | 704/235 |
| 8,744,239 | B2 * | 6/2014 | Rodriguez | G11B 27/34 |
| | | | | 386/241 |
| 10,642,463 | B2 * | 5/2020 | Threewits | G09B 19/003 |
| 2004/0044532 | A1 * | 3/2004 | Karstens | H04N 21/4126 |
| | | | | 704/271 |
| 2012/0245934 | A1 | 9/2012 | Talwar et al. | |
| 2013/0151250 | A1 * | 6/2013 | VanBlon | G10L 15/30 |
| | | | | 704/235 |
| 2015/0234635 | A1 * | 8/2015 | Beaumont | G06F 3/04845 |
| | | | | 704/275 |
| 2016/0062970 | A1 * | 3/2016 | Sadkin | G06F 40/106 |
| | | | | 715/233 |
| 2016/0124909 | A1 * | 5/2016 | Basson | G06F 3/0484 |
| | | | | 715/732 |
| 2017/0140759 | A1 * | 5/2017 | Kumar | G10L 15/30 |
| 2018/0046331 | A1 * | 2/2018 | Monson | G06F 40/109 |
| 2021/0142785 | A1 * | 5/2021 | Wang | G10L 13/047 |

| | | | | |
|---|---|---|---|---|
| 2022/0139380 | A1 * | 5/2022 | Meng | G06N 3/0442 |
| | | | | 704/232 |
| 2022/0319506 | A1 * | 10/2022 | Heikinheimo | G10L 15/16 |
| 2023/0290349 | A1 * | 9/2023 | Dalgoutte | H04N 23/66 |
| 2024/0114106 | A1 * | 4/2024 | Chandran | G10L 15/26 |
| 2024/0428784 | A1 * | 12/2024 | Jiang | G10L 15/22 |

FOREIGN PATENT DOCUMENTS

| | | |
|---|---|---|
| CN | 110097870 A | 8/2019 |
| CN | 110634474 A | 12/2019 |
| CN | 109658938 B | 3/2020 |
| CN | 110910918 A | 3/2020 |
| CN | 111179939 A | 5/2020 |
| CN | 111798846 A | 10/2020 |
| CN | 112259101 A | 1/2021 |
| CN | 113724709 A | 11/2021 |
| JP | H09-065176 A | 3/1997 |

OTHER PUBLICATIONS

China Patent Application No. 202111016289.2; Office Action; dated Feb. 28, 2024; 24 pages.
Xu Jiepan et al.; "Introduction to artificial intelligence—second edition"; China Railway Publishing House Co. Ltd.; Apr. 2021; p. 181-182.

* cited by examiner

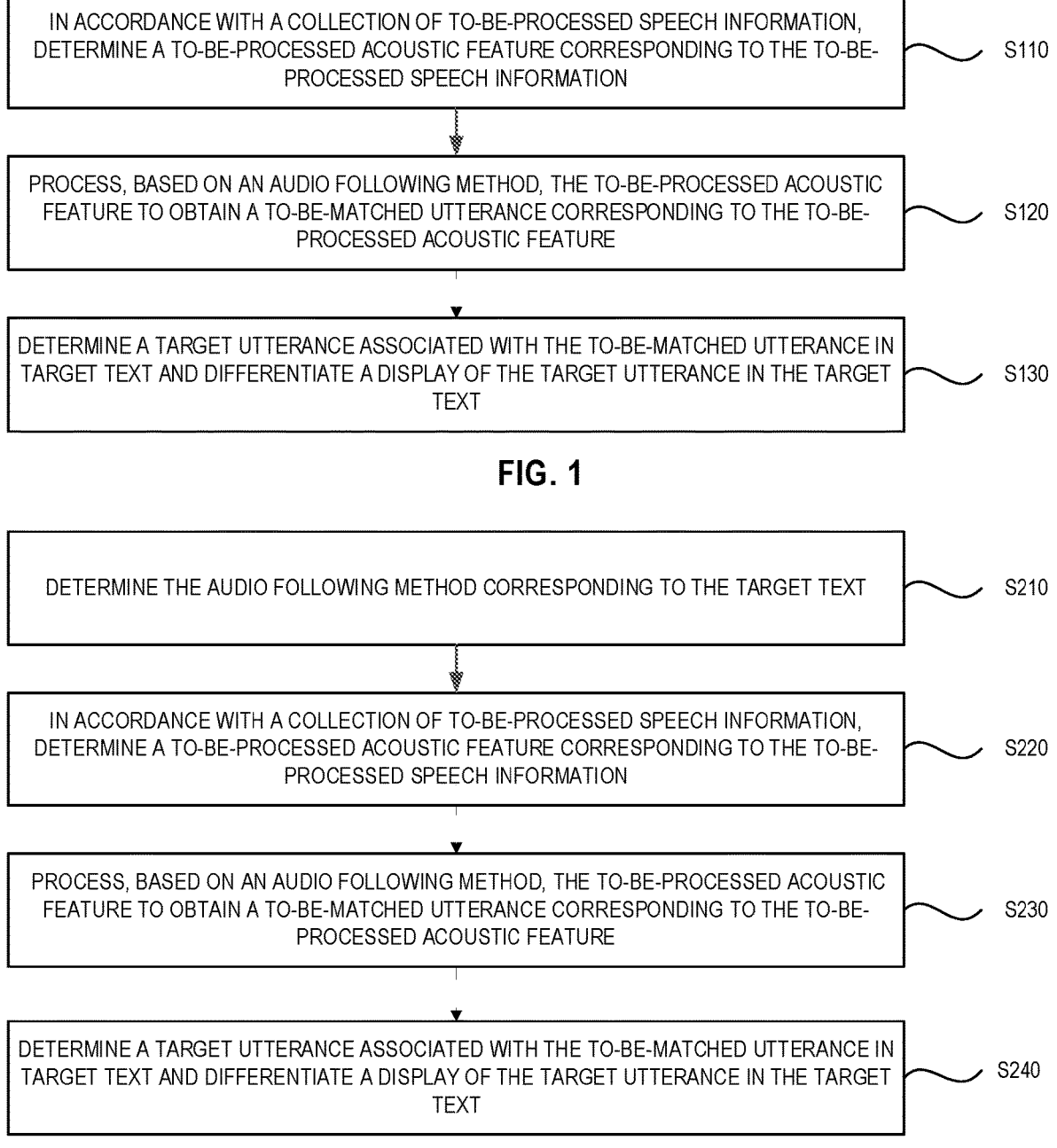

IN ACCORDANCE WITH A COLLECTION OF TO-BE-PROCESSED SPEECH INFORMATION, DETERMINE A TO-BE-PROCESSED ACOUSTIC FEATURE CORRESPONDING TO THE TO-BE-PROCESSED SPEECH INFORMATION          S110

PROCESS, BASED ON AN AUDIO FOLLOWING METHOD, THE TO-BE-PROCESSED ACOUSTIC FEATURE TO OBTAIN A TO-BE-MATCHED UTTERANCE CORRESPONDING TO THE TO-BE-PROCESSED ACOUSTIC FEATURE          S120

DETERMINE A TARGET UTTERANCE ASSOCIATED WITH THE TO-BE-MATCHED UTTERANCE IN TARGET TEXT AND DIFFERENTIATE A DISPLAY OF THE TARGET UTTERANCE IN THE TARGET TEXT          S130

FIG. 1

DETERMINE THE AUDIO FOLLOWING METHOD CORRESPONDING TO THE TARGET TEXT          S210

IN ACCORDANCE WITH A COLLECTION OF TO-BE-PROCESSED SPEECH INFORMATION, DETERMINE A TO-BE-PROCESSED ACOUSTIC FEATURE CORRESPONDING TO THE TO-BE-PROCESSED SPEECH INFORMATION          S220

PROCESS, BASED ON AN AUDIO FOLLOWING METHOD, THE TO-BE-PROCESSED ACOUSTIC FEATURE TO OBTAIN A TO-BE-MATCHED UTTERANCE CORRESPONDING TO THE TO-BE-PROCESSED ACOUSTIC FEATURE          S230

DETERMINE A TARGET UTTERANCE ASSOCIATED WITH THE TO-BE-MATCHED UTTERANCE IN TARGET TEXT AND DIFFERENTIATE A DISPLAY OF THE TARGET UTTERANCE IN THE TARGET TEXT          S240

FIG. 2

METHOD, APPARATUS, ELECTRONIC DEVICE AND STORAGE MEDIUM FOR TEXT CONTENT MATCHING

The present application is the U.S. National Stage of International Application No. PCT/CN2022/111140, filed on Aug. 9, 2022, which claims priority to Chinese Patent Application No. 202111016289.2 filed on Aug. 31, 2021, which are incorporated herein by reference in their entireties.

FIELD

The present disclosure relates to the technical field of computers, for example, to a method, apparatus, electronic device, and storage medium for text content matching.

BACKGROUND

When a user is broadcasting, it is mostly implemented based on a teleprompter.

The teleprompter mostly plays the role of displaying broadcast texts, for example, scrolling broadcast text, at this time, there is a problem that the teleprompter displays the content too fast or too slow, resulting in the broadcast users can not follow the problem in time; meanwhile, the broadcast user is broadcasting based on the broadcast texts, the existence of serialization and other problems, resulting in poor broadcast effect.

SUMMARY

The present disclosure provides a method, apparatus, electronic device, and storage medium for text content matching, to determine an utterance in a target text based on a collection of to-be-processed speech information and differentiate a display on the utterance to implement content prompted by the teleprompter to follow the user intelligently and improve the prompting effect.

The present disclosure provides a method of text content matching, the method comprising:

in accordance with a collection of to-be-processed speech information, determining a to-be-processed acoustic feature corresponding to the to-be-processed speech information;

processing, based on an audio following method, the to-be-processed acoustic feature to obtain a to-be-matched utterance corresponding to the to-be-processed acoustic feature; and determining a target utterance associated with the to-be-matched utterance in target text and differentiating a display of the target utterance in the target text.

The present disclosure further provides an apparatus for text content matching, the apparatus comprising:

an acoustic feature determination module configured to, in accordance with a collection of to-be-processed speech information, determine a to-be-processed acoustic feature corresponding to the to-be-processed speech information;

a to-be-matched text determination module configured to process, based on an audio following method, the to-be-processed acoustic feature to obtain a to-be-matched utterance corresponding to the to-be-processed acoustic feature; and a differentiating displaying module configured to determine a target utterance associated with the to-bematched utterance in target text and differentiating a display of the target utterance in the target text.

The present disclosure further provides an electronic device, the electronic device comprising:

at least one processor; and a storage device configured to store at least one program;

wherein the at least one program, when executed by the at least one processor, causes the at least one processor to implement the above-mentioned method of text content matching.

The present disclosure further provides a storage medium comprising computer-executable instructions, the computer-executable instructions, when executed by a computer processor, configured to perform the above-mentioned method of text content matching.

BRIEF DESCRIPTION OF THE DRAWINGS

FIG. 1 is a schematic flowchart of a method of text content matching provided by embodiment 1 of the present disclosure;

FIG. 2 is a schematic flowchart of a method of text content matching provided by embodiment 2 of the present disclosure;

DETAILED DESCRIPTION

Figure 3:
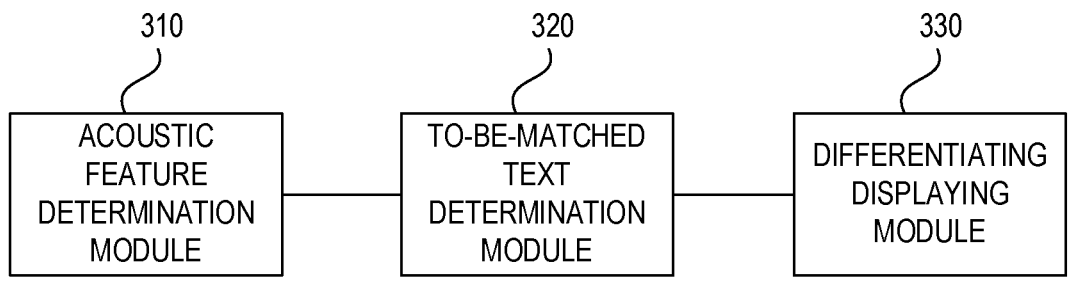
FIG. 3 is a structural schematic diagram of an apparatus for text content matching provided by embodiment 3 of the present disclosure.

Embodiments of the present disclosure will be described below with reference to the accompanying drawings. Although some embodiments of the present disclosure are shown in the accompanying drawings, however, the present disclosure can be implemented in a variety of forms, and these embodiments are provided for the purpose of understanding the present disclosure. The accompanying drawings and embodiments of the present disclosure are intended to be exemplary only.

The plurality of steps documented in the method embodiments of the present disclosure may be performed in a different order, and/or in parallel. In addition, the method embodiments may comprise additional steps and/or omit performing the illustrated steps. The scope of the present disclosure is not limited in this regard.

As used herein, the term "comprises" and its variations are open-ended, i.e., "comprising, but not limited to". The term "based on" is "based at least partially on". The term "one embodiment" represents "at least one embodiment"; the term "another embodiment" represents "at least one additional embodiment"; the term "some embodiments" represents "at least some embodiments". Related definitions of other terms will be given in the description below.

It should be noted that references to the concepts of "first", "second" and the like in the present disclosure are only used to distinguish different apparatuses, modules, or units, and are not intended to limit the order or interdependence of the functions performed by these apparatuses, modules, or units.

It should be noted that references to the qualifications "one" and "a plurality of" in the present disclosure are schematic rather than limiting. It should be understood by those skilled in the art that the term "one or more" should be understood unless the context clearly indicates otherwise.

The names of the messages or information interacted with between the plurality of apparatuses of the embodiments of the present disclosure are used for illustrative purposes only and are not intended to place limitations on the scope of those messages or information.

Before introducing the present technical solution, the application scenes of the present technical solution can be illustrated exemplarily. The present technical solution can be applied to a teleprompter, and it can further be applied to any scene in which broadcast text prompting is required. For example, in the live broadcasting scene, the user can broadcast based on the pre-edited broadcasting text, and at this time, the broadcasting text can be displayed on the display interface, meanwhile, the speech information of the user can be captured and the corresponding location of the speech information in the broadcasting text can be determined, and the display of the text at the location can be differentiated, so as to implement the effect of intelligent following and using experience.

Embodiment 1

FIG. 1 is a schematic flowchart of a method of text content matching provided by embodiment 1 of the present disclosure. Embodiments of the present disclosure may be applicable to situations in which there is a need to intelligently follow the location of a speech content of a target user in a target text in an Internet-supported real-time interactive scene or a non-real-time interactive scene. The method may be implemented by an apparatus for text content matching, which may be implemented in the form of software and/or hardware, e.g., by an electronic device, which may be a mobile terminal, a Personal Computer (PC) terminal, or a server terminal, etc. Real-time interactive application scenarios are usually implemented in conjunction with a client and a server, and the method provided in the present embodiment can be implemented by the client, the server, or in conjunction with both.

S110. In accordance with a collection of to-be-processed speech information, determine a to-be-processed acoustic feature corresponding to the to-be-processed speech information.

When interacting in real-time or non-real-time interactive scenes with text, the text is determined as the target text. When broadcasting based on the target text, the target text can be uploaded to a target terminal first, to display the uploaded target text on a display interface by the target terminal. The target terminal can be a mobile terminal or an application corresponding to a teleprompter.

When the user broadcasts based on the target text displayed on the display interface, for a good prompt effect, dynamic following of speech and a target text content can be performed, i.e., when the user performing speech broadcasting, a corresponding location in the broadcast text can be determined based on the speech information of the broadcast user, and the display of the text at that location can be differentiated.

When the broadcasting user sends out a speech, collected speech information is determined as to-be-processed speech information, based on a speech collection apparatus collecting the speech information of the broadcast user. The speech collection apparatus can be a microphone array on the mobile terminal or a microphone array in an environment where the broadcast user is located.

When the user broadcasts based on the text content displayed on the mobile terminal or based on the broadcast text on the teleprompter, the microphone array at the mobile terminal or at the site where the broadcast user is located can collect the speech information of the target user to obtain the to-be-processed speech information. For example, feature extraction can be performed on the to-be-processed speech information to obtain a to-be-processed acoustic feature corresponding to the to-be-processed speech information.

In the present embodiment, the to-be-broadcasted text of the broadcast user can be determined as the target text. Before collecting the to-be-processed speech information, the broadcast text can be uploaded to a server or a terminal, and then displayed on a display interface, and the user can broadcast based on the target text displayed on the display interface.

In one embodiment, the target text is uploaded to determine, in accordance with the collection of the to-be-processed speech information, the target utterance associated with the to-be-matched utterance corresponding to the to-be-processed speech information in the target text.

Before collecting to-be-processed speech information, the broadcasted text can be uploaded to the server or terminal and then displayed on the display interface.

In the present embodiment, the in accordance with a collection of to-be-processed speech information, determining a to-be-processed acoustic feature corresponding to the to-be-processed speech information comprises: in accordance with a determination that a user interacts based on a real-time interactive interface, collecting to-be-processed speech information of a target user; and performing, based on an audio feature extraction algorithm, feature extraction on the to-be-processed speech information, and obtaining a to-be-processed acoustic feature corresponding to the to-be-processed speech information.

A real-time interactive interface is a page generated based on computer technology.

In accordance with a determination that a user interacts based on a real-time interactive interface, if the target user sends out a speech, the to-be-processed speech information of the target user can be collected. At the same time, feature extraction on the to-be-processed speech information can be performed based on an audio feature extraction algorithm, and the acoustic feature can be determined as the to-be-processed acoustic feature corresponding to the to-be-processed speech information.

S120. Process, based on an audio following method, the to-be-processed acoustic feature to obtain a to-be-matched utterance corresponding to the to-be-processed acoustic feature.

The audio following method can process the acoustic feature of the to-be-processed speech information, thereby obtaining a of obtaining an utterance corresponding to the to-be-processed speech information, i.e., a method for determining the text corresponding to the to-be-processed speech information.

In the present embodiment, the processing, based on an audio following method, the to-be-processed acoustic feature may be: processing, based on a decoder and/or a keyword detection system in the audio following method, the to-be-processed acoustic feature.

In order to describe how to process, based on the decoder and/or the keyword detection system, the to-be-processed acoustic feature, reference may be made to the following specific embodiments:

In one embodiment, the to-be-processed acoustic feature is processed based on an acoustic model in the audio following method, to obtain an acoustic posterior probability corresponding to the to-be-processed acoustic feature; based on the acoustic posterior probability and a decoder corresponding to the target text in the audio following method, a first to-be-determined utterance corresponding to the to-be-processed acoustic feature and first confidence corresponding to the first to-be-determined utterance is determined; wherein the decoder is determined based on an interpolation language model corresponding to the target text, and the interpolation language model is determined based on a target language model and an ordinary language model corresponding to the target text; and in accordance with a determination that the first confidence satisfies a predetermined confidence threshold, the first to-be-determined utterance as the to-be-matched utterance is determined.

The corresponding decoder can be generated based on the content of the target text, i.e., for different target texts, the corresponding decoder for different target texts is different. The keyword detection system is a system that comprises all vocabularies in the target text after processing the target text.

In the present embodiment, the to-be-processed speech information may be processed based only on the decoder in the audio following algorithm. The to-be-processed acoustic feature is first processed by an acoustic model, and an acoustic posterior probability corresponding to the to-be-processed acoustic feature is obtained. The acoustic posterior probability is determined as an input to the decoder to obtain a first to-be-determined utterance corresponding to the acoustic posterior probability and a first confidence of the first to-be-determined text. The confidence is used to characterize the accuracy of the first to-be-determined utterance. In practice, if the first confidence reaches a predetermined confidence threshold, it means that the accuracy of the first to-be-determined utterance is relatively high, and the first to-be-determined utterance can be determined as the to-be-matched utterance.

On the basis of the above technical solution, if only the keyword detection system is used for processing the to-be-processed acoustic feature, it can be: determining, based on a keyword detection system and the to-be-processed acoustic feature in the audio following method, a second to-be-determined utterance corresponding to the to-be-processed acoustic feature and a second confidence corresponding to the second to-be-determined utterance; wherein the keyword detection system matches the target text; and in accordance with a determination that the second confidence satisfies a predetermined confidence threshold, determining the second to-be-determined utterance as the to-be-matched utterance.

The to-be-processed acoustic feature can be input into the keyword detection system, and the keyword detection system can output a second to-be-determined utterance corresponding to the to-be-processed acoustic feature, and further a second confidence of the second to-be-determined utterance. If the second confidence value is higher than the predetermined confidence threshold, it means that the second determined utterance is more accurate, and in this case, the second to-be-determined utterance can be determined as the to-be-matched utterance.

In order to improve the accuracy of the determined to-be-processed acoustic utterance, the decoder and the keyword detection system can be used to process the to-be-processed acoustic feature together to determine the to-be-matched utterance corresponding to the to-be-processed acoustic feature.

In one embodiment, the audio following method comprises a keyword detection system and a decoder, and the to-be-processed acoustic feature based on the decoder and the keyword detection system are processed respectively, and in accordance with a determination that a first to-be-determined utterance and a second to-be-determined utterance are obtained, the to-be-matched utterance is determined based on a first confidence of the first to-be-determined utterance and a second confidence of the second to-be-determined utterance. The decoder and the keyword detection system can be used to process the to-be-processed acoustic feature to obtain the first to-be-determined utterance and the second to-be-determined utterance corresponding to the to-be-processed acoustic feature. At the same time, the confidence of the first to-be-determined utterance and the second to-be-determined utterance can further be obtained. The contents of the first to-be-determined utterance and the second to-be-determined utterance may be the same or different, and accordingly, the first confidence and the second confidence may be the same or different.

If the first to-be-determined utterance and the second to-be-determined utterance are the same, and the first confidence and the second confidence are both higher than a predetermined confidence threshold, the text content corresponding to any one of the first to-be-determined utterance and the second to-be-determined utterance may be determined as the to-be-matched utterance. If the contents of the first to-be-determined utterance and the second to-be-determined utterance are different, and the first confidence and the second confidence are both higher than the predetermined confidence threshold, then the text corresponding to the to-be-determined utterance with the higher confidence among the first to-be-determined utterance and the second to-be-determined utterance can be determined as the to-be-matched utterance. If the contents of the first to-be-determined utterance and the second to-be-determined utterance are different, and the first confidence and the second confidence are both lower than the predetermined confidence threshold, then it means that the contents of the current speech of the target user are not related to the contents of the target text, and it is not necessary to determine the utterance of the current speech information in the target text.

S130. Determine a target utterance associated with the to-be-matched utterance in target text and differentiate a display of the target utterance in the target text.

The target text may comprise a plurality of utterances, and the utterance that corresponds to the to-be-matched utterance may be determined as the target utterance. The next utterance or the next two utterances of the to-be-matched utterance may further be determined as the target utterance. Alternatively, when the speech speed of the user is slow, the utterance corresponding to the detected text is determined, and the unread content of the utterance is determined as the target utterance. If the application scene is a broadcasting scene, in order to make it easier for the target user to determine the location of the currently broadcast content in the target text, or to quickly determine the location of the currently broadcast utterance in the target text when the target broadcast user continues to broadcast the content in the target text after saying other vocabularies, the play of the target utterance can be differentiated in the target text. The advantage of the differentiation of the display is that it is easy for the broadcast user to determine which utterance in the target text has been broadcast, and at the same time, it can also quickly determine what the next utterance of the utterance will be, avoiding the problem of serialization during the broadcast process, and improving the convenience and accuracy of broadcasting.

After determining the to-be-matched utterance, it can match the respective sentence in the target text according to the to-be-matched utterance, and the matched utterance can be determined as the target utterance. At the same time, in order to achieve the effect of reminding the user, the play of the target utterance can be differentiated in the target text.

On the basis of the above technical solution, in order to quickly determine the target utterance of the to-be-matched utterance in the to-be-broadcasted target text, it is possible to adopt the following method: if the target text at the current moment comprises a differentially displayed broadcasted utterance, then the target utterance of the to-be-matched utterance in the target text is determined with the broadcasted utterance as the starting point.

During broadcasting by the target user, it is possible to differentiate between the broadcasted and un-broadcasted utterances in the target text. For example, a different font or transparency can be used to display the broadcasted utterance and the un-broadcasted utterance, e.g., the transparency of the broadcasted text can be set to a higher level to minimize interference with the un-broadcasted text. When determining the target utterance at the current moment, it is possible to start from the last utterance in the broadcast utterance, determine the utterance in the un-broadcasted utterance that is consistent with the to-be-matched utterance as the target utterance, and differentiate the display of the target utterance.

The differentiating of the display methods corresponding to different contents can be predetermined, i.e., the methods of differentiating the broadcasted utterances, un-broadcasted utterances, and target utterances can be different, thereby achieving the technical effect of effectively reminding the broadcast users.

In practice, in order to improve the efficiency of determining the target utterances, it is possible to determine the broadcasted utterances as the starting point and obtain a predetermined number of utterances after the starting point. For example, if three utterances are obtained after the starting point, these three utterances can be determined as the to-be-aligned un-broadcasted utterances. If there is an utterance in the to-be-aligned un-broadcasted utterance that is consistent with the to-be-matched utterance, the utterance that is consistent with the to-be-matched utterance can be determined as the target utterance. If the to-be-aligned un-broadcasted utterance does not comprise a to-be-matched utterance, then the target text does not comprise a to-be-matched utterance.

In the present embodiment, the differentiating a display of the target utterance in the target text can be: highlighting the target utterance; or, displaying the target utterance in bold; or, displaying utterances in the target text other than the target utterance in a semi-transparent form; wherein transparency of a predetermined number of unmatched utterances adjacent to the target utterance is lower than transparency of other unmatched utterances.

It is possible to highlight the target utterance to indicate to the user that it is the current utterance being broadcast or to display the target utterance in bold. Alternatively, utterances in the target text other than the target utterance are displayed in a semi-transparent form to avoid interference with the broadcasting of the target user when the other utterances are displayed. Generally, in order to facilitate the target user to understand the content corresponding to the front and back of the target statement, the transparency of a predetermined number of utterances adjacent to the target utterance can be set lower, so that the target user can understand the front and back meanings of the target utterance in the broadcasting process, thereby improving the broadcasting efficiency and user experience of the broadcast user.

The technical solution of the embodiments of the present disclosure is by determining the to-be-processed acoustic feature corresponding to the to-be-processed speech information when the to-be-processed speech information is collected, and by inputting the acoustic feature to the decoder corresponding to the target text and/or the keyword detection system, the to-be-matched utterance corresponding to the to-be-processed acoustic feature can be obtained. At the same time, the utterance of the to-be-matched utterance in the target text can be determined, which solves the problem that the teleprompter in the related technology only plays a role in displaying the broadcast text, and cannot effectively prompt the user, resulting in poor prompting effect, which implements that in the process of the target user broadcasting, the speech information of the broadcast user is collected, and the target utterance corresponding to the speech information in the broadcast text is determined, and the differentiation is displayed on the teleprompter, so as to achieve the teleprompter can intelligently follow the broadcast user, and thus improve the technical effect of the broadcast effect.

Embodiment 2

FIG. 2 is a schematic flowchart of a method of text content matching provided by embodiment 2 of the present disclosure. On the basis of the foregoing embodiments, a decoder and a keyword detection system corresponding to the target text can be determined first, and then to-be-processed acoustic feature can be processed on the basis of the decoder and the keyword detection system, and its specific implementation can be found in the description of the present technical program. Herein, the technical terms which are the same as or corresponding to the above-mentioned embodiments are not repeated herein.

As shown in FIG. 2, the method comprises:

S210. Determine the audio following method corresponding to the target text.

In the present embodiment, the audio following method comprises a decoder and a keyword detection system. Determining the audio following method corresponding to the target text may be: obtaining the target text, and performing vocabulary-partitioning processing on the target text to obtain at least one broadcast vocabulary corresponding to the target text; obtaining a target language model based on the at least one broadcast vocabulary; determining an interpolated language model based on the target language model and an ordinary language model; performing dynamic composition on the interpolated language model by means of a weighted finite state transformation machine to obtain the decoder corresponding to the target text.

Various vocabulary-partitioning tools, e.g., Jieba segmentation, can be adopted to perform vocabulary-partitioning on the target text to obtain at least one broadcast vocabulary. After obtaining at least one broadcast vocabulary, a target language model corresponding to the target text can be trained, which can be a binary categorization model. The common language model is a frequently used language model. Based on the target language model and the general language model, an interpolation language model can be obtained. The interpolated language model can determine the speech spoken by the target user on the way to broadcast that is not related to the target text. The decoder corresponding to the interpolated language model can be obtained by adopting the dynamic composition of weighted finite transducer. This decoder is highly correlated with the target text. Therefore, the to-be-matched utterance corresponding to the to-be-processed acoustic feature can be determined efficiently based on this decoder.

In the present embodiment, determining the keyword detection system corresponding to the target text may be: dividing the target text into at least one broadcast vocabulary; determining a category corresponding to the at least one broadcast vocabulary based on a predetermined categorization rule; and generating the keyword detection system based on the broadcast vocabularies corresponding to the respective category.

For example, based on word-splitting tools, the target text can be divided into a plurality of broadcast vocabulary. Each broadcast vocabulary can be determined as a keyword. The predetermined categorization rules can be how to categorize the keywords. After determining the categories to be classified, the broadcast vocabulary corresponding to respective category can be determined, and then a keyword detection system can be generated based on the broadcast vocabulary of respective category.

S220. In accordance with a collection of to-be-processed speech information, determine a to-be-processed acoustic feature corresponding to the to-be-processed speech information.

S230. Process, based on an audio following method, the to-be-processed acoustic feature to obtain a to-be-matched utterance corresponding to the to-be-processed acoustic feature.

After a collection of the to-be-processed speech information of the target user based on the microphone array, i.e., the wav speech waveform, the to-be-processed acoustic features can be extracted from the to-be-processed speech information based on the method of speech audio feature extraction. Processing the to-be-processed acoustic features based on the conformer acoustic model, the acoustic posterior probability can be obtained. The acoustic posterior probability can be input into the decoder to obtain a first to-be-determined utterance and a confidence corresponding to the first to-be-determined utterance. At the same time, the to-be-processed acoustic feature can be input to the keyword detection system to obtain a second to-be-determined utterance corresponding to the to-be-processed acoustic feature and a confidence corresponding to the second to-be-determined utterance. The to-be-matched utterance is determined by fusing the to-be-determined utterances corresponding to the two confidences. For example, the to-be-matched utterance with the higher confidence is determined as the to-be-matched utterance.

S240. Determine a target utterance associated with the to-be-matched utterance in target text and differentiate a display of the target utterance in the target text.

The last utterance of the currently broadcasted text in the target text can be determined as the starting point to determine whether the next utterance is the same as the to-be-matched utterance, and if the next utterance is the same as the to-be-matched utterance, the next utterance is determined to be the target utterance. If the next sentence does not match the to-be-matched utterance, then determine whether the next utterance of the next text matches the to-be-matched utterance, and if the next utterance of the next text matches the to-be-matched utterance, then determine the utterance as the target utterance. If there is no target utterance that matches the to-be-matched utterance, then it is determined that what the target user is saying has no relationship with the target text and can be left out of the process.

Based on the above technical solution, in the process of determining the target utterance, it further comprises: determining an actual speech duration corresponding to the target utterance; adjusting a predicted speech duration corresponding to an unmatched utterance based on the actual speech duration and the unmatched utterance in the target text; and displaying the predicted speech duration on a target client as a prompt to the target user.

The actual speech duration refers to the time used by the target user to speak the target utterance, e.g., 2 s. The predicted speech duration refers to the time required by the target user to broadcast the subsequent un-broadcasted utterances. The predicted broadcast duration is a dynamically adjusted duration, and its adjustment is mainly based on the speech rate of the target user. The speed of speech is determined based on the actual speech duration of the target utterance and the number of words corresponding to the target utterance, and the length of time used for respective word is determined. Based on the length of time used for respective word and the total number of words of the subsequent un-broadcasted utterance, the length of time required for the subsequent broadcasting of the un-broadcasted utterance can be determined. The un-broadcasted utterance can be determined as unmatched utterance.

In the actual application process, in order to achieve the effect of timely reminding the user, the predicted speech duration can be displayed on the target client corresponding to the target user. At the same time, the target user can also adjust the speech speed of the broadcast text based on the predicted speech duration, so that the broadcast duration is consistent with the predetermined duration, i.e., the content of the target text can be broadcast within the limited time.

For the target user, the time used for broadcasting respective utterance is different, and the corresponding time used for broadcasting respective word is also different. During the broadcasting process of the target user, the predicted speech time can be dynamically adjusted based on the time used for the current broadcast of respective word.

On the basis of the above technical solution, the method further comprises: in accordance with a reception of the target text, performing utterance-segmentation marking on the target text, and displaying an utterance-segmentation marking identification on a client, to cause a user to read the target text based on the utterance-segmentation marking identification.

With the widespread popularity of video capturing, not every video creator has the opportunity to receive professional training in broadcasting and hosting, so a teleprompter or an application that can help video creators with no basic knowledge of broadcasting to produce higher-quality spoken word videos will become more universal. For ordinary users who lack the analyzing ability of professional word-splitting, they are unable to determine when to pause and what kind of emotion to deal with each utterance of the broadcasting text when facing the input target text. Therefore, on the basis of the above technical effect, the present technical solution is also equipped with a utterance-segmentation marking model, so that after uploading the target text, the utterance-segmentation marking can be performed on the target text, and the utterance-segmentation marking results will be displayed on the target terminal used by the target user, thus enabling the user to broadcast the target text based on the utterance-segmentation marking, and improving the professionalism of the broadcast target text.

Utterance-segmentation marking can be indicated by "/". For example, if a long pause is needed, it can be indicated by "——", and if a short pause is needed, it can be indicated by "—". If two words need to be read together, it can be indicated by "( )", etc. At the same time, utterance-segmentation marking can be displayed in the target text and the target text can be displayed on the target terminal.

After uploading the target text to the server corresponding to the mobile terminal, utterance-segmentation marking can be performed on the target text, so that when the target user is broadcasting, it can be determined immediately on the basis of the utterance-segmentation marking how to broadcast, thus solving the problem that the related technology requires manually determining how to perform utterance-segmentation marking on the content of the broadcast text, and the efficiency is relatively low.

In the present embodiment, performing utterance-segmentation marking on the target text may be implemented based on a pre-trained word-splitting and utterance-segmentation model.

Based on the above technical solution, the method further comprises: performing broadcast markinginging on the broadcasted utterance in the target text, to determine the broadcasted utterances and un-broadcasted utterances in the target text based on the broadcast markingings.

In the process of user broadcasting, different colors can be used to mark the broadcasted and un-broadcasted utterances in the target text, causing the target user to differentiate between the broadcasted and un-broadcasted utterances in the process of broadcasting. At the same time, the play of the target content can also be differentiated to achieve a clear reminder of what the target user has read and what is about to be read, which solves the problem of serialization of the target user in the process of broadcasting the text.

On the basis of the aforesaid technical solution, the method further comprises: in accordance with a reception of the uploaded target text, performing emotion marking on respective utterance in the target text based on a pre-trained emotion marking model, to cause a user to broadcast the target text based on the emotional marking identification. That is, in accordance with a reception of the target text, performing emotion marking on respective utterance in the target text, and displaying an emotion marking identification on a client, to cause a user to read the target text based on the emotional marking identification.

For ordinary users, in addition to not knowing where to pause in the target text, usually, it is also not clear what kind of emotion color should be used to broadcast the text. At this point, after receiving the uploaded target text, the target text can be pre-processed. For example, emotion color analysis can be performed on respective utterance in the target text, and expression marking is performed on the analyzed respective utterance, to cause the user to broadcast the content of the target text based on the emotion color markings, thus solving the problem of stagnant reading of the manuscript.

The technical solution of an embodiment of the present disclosure, by performing word-splitting processing on the uploaded target text, obtaining a decoder and a keyword detection system corresponding to the target text, and then processing the extracted acoustic features based on the decoder and the keyword detection system, whether what the user is saying is the content in the target text can be determined, and then differentiated the display of the target text, thus implementing the effect that the differentiated text can intelligently follow the anchor user. At the same time, in order to improve the broadcasting effect, utterance-segmentation marking and emotion marking can be performed on the target text, to cause the user to follow the anchor user based on the displayed utterance-segmentation marking and emotion marking, and at the same time, in order to improve the broadcasting effect, the target text can be marked with utterance-segmentation marking and emotion marking, to cause the user to follow the anchor user based on the displayed utterance-segmentation marking and emotion marking, implementing the three-dimensionality of the broadcast text.

Embodiment 3

FIG. 3 is a structural schematic diagram of an apparatus for text content matching provided by embodiment 3 of the present disclosure, which can perform any method of text content matching provided in the present disclosure and has corresponding functional modules and effects for performing the method. As shown in FIG. 3, the method comprises: an acoustic feature determination module 310, a to-be-matched text determination module 320, and a differentiating displaying module 330.

The acoustic feature determination module 310 is configured to, in accordance with a collection of to-be-processed speech information, determine a to-be-processed acoustic feature corresponding to the to-be-processed speech information; the to-be-matched text determination module 320 is configured to process, based on an audio following method, the to-be-processed acoustic feature to obtain a to-be-matched utterance corresponding to the to-be-processed acoustic feature; and the differentiating displaying module 330 is configured to determine a target utterance associated with the to-be-matched utterance in target text and differentiating a display of the target utterance in the target text.

On the basis of the above technical solution, the apparatus further comprises: a broadcast text uploading module configured to upload the target text to determine, in accordance with the collection of the to-be-processed speech information, the target utterance associated with the to-be-matched utterance corresponding to the to-be-processed speech information in the target text.

Based on the above technical solution, the acoustic feature determination module 310 comprises:

a speech information obtaining unit configured to, in accordance with a determination that a user interacts based on a real-time interactive interface, collect to-be-processed speech information of a target user; and an acoustic feature determination unit configured to perform, based on an audio feature extraction algorithm, feature extraction on the to-be-processed speech information, and obtaining a to-be-processed acoustic feature corresponding to the to-be-processed speech information.

Based on the above technical solution, the to-be-matched text determination module 320 comprises:

an acoustic posterior probability determination unit configured to process the to-be-processed acoustic feature based on an acoustic model in the audio following method, to obtain an acoustic posterior probability corresponding to the to-be-processed acoustic feature; a first confidence determination unit configured to determine, based on the acoustic posterior probability and a decoder corresponding to the target text in the audio following method, a first to-be-determined utterance corresponding to the to-be-processed acoustic feature and a first confidence corresponding to the first to-be-determined utterance; wherein the decoder is determined based on an interpolation language model corresponding to the target text, and the interpolation language model is determined based on a target language model and an ordinary language model corresponding to the target text; and a to-be-matched text determination unit configured to, in accordance with a determination that the first confidence satisfies a predetermined confidence threshold, determining the first to-be-determined utterance as the to-be-matched utterance.

Based on the above technical solution, the to-be-matched text determination module 320 comprises:

a second confidence determination unit configured to determine, based on a keyword detection system and the to-be-processed acoustic feature in the audio following method, a second to-be-determined utterance corresponding to the to-be-processed acoustic feature and a second confidence corresponding to the second to-be-determined utterance; wherein the keyword detection system matches the target text; and a to-be-matched utterance determination unit configured to, in accordance with a determination that the second confidence satisfies a predetermined confidence threshold, determine the second to-be-determined utterance as the to-be-matched utterance.

On the basis of the above technical solution, the to-be-matched text determination module 320 is configured to, wherein the audio following method comprising a keyword detection system and a decoder, process the to-be-processed acoustic feature based on the decoder and the keyword detection system, respectively, and in accordance with a determination that a first to-be-determined utterance and a second to-be-determined utterance are obtained, determine the to-be-matched utterance based on a first confidence of the first to-be-determined utterance and a second confidence of the second to-be-determined utterance.

On the basis of the above technical solution, the apparatus further comprises: a decoder determination module configured to determine a decoder corresponding to the target text; a decoder determination module configured to determine a decoder corresponding to the target text by: obtaining the target text and performing word-splitting on the target text to obtain at least one broadcast vocabulary corresponding to the target text; obtaining a target language model based on the at least one broadcast vocabulary; determining an interpolation language model based on the target language model and the ordinary language model; obtaining a decoder corresponding to the target text by dynamically composing the interpolation language model through a weighted finite state conversion machine.

Based on the above technical solution, the apparatus further comprises: a detection system determination module, configured to:

divide the target text into at least one broadcast vocabulary; determine a category corresponding to the at least one broadcast vocabulary based on a predetermined categorization rule; and generate the keyword detection system based on the broadcast vocabularies corresponding to the respective category.

On the basis of the above technical solution, the differentiating displaying module 330 is configured to, if the target text at the current moment comprises a differentially displayed broadcasted utterance, determine, with the broadcasted utterance as the starting point, the target utterance of the to-be-matched utterance in the target text.

Based on the above technical solution, the differentiating displaying module 330 is configured to determine, with the broadcasted utterance as the starting point, a predetermined number of to-be-aligned un-broadcasted utterances after the starting point; if there is an utterance in the to-be-aligned un-broadcasted utterances that is consistent with the to-be-matched utterance, determine the utterance that is consistent with the to-be-matched utterance as the target utterance.

Based on the above technical solution, the differentiating displaying module 330 is configured to highlight the target utterance; or display the target utterance in bold; or display utterances in the target text other than the target utterance in a semi-transparent form; wherein transparency of a predetermined number of unmatched utterances adjacent to the target utterance is lower than transparency of other unmatched utterances.

Based on the above technical solution, the differentiating displaying module 330 is further configured to determine an actual speech duration corresponding to the target utterance; adjust a predicted speech duration corresponding to an unmatched utterance based on the actual speech duration and the unmatched utterance in the target text; and display the predicted speech duration on a target client as a prompt to the target user.

On the basis of the above technical solution, the apparatus further comprises: an utterance-segmentation marking module configured to, in accordance with a reception of the target text, perform utterance-segmentation marking on the target text, and displaying an utterance-segmentation marking identification on a client, to cause a user to read the target text based on the utterance-segmentation marking identification.

On the basis of the above technical solution, the apparatus further comprises: an emotion marking module configured to, in accordance with a reception of the target text, perform emotion marking on respective utterance in the target text, and displaying an emotion marking identification on a client, to cause a user to read the target text based on the emotional marking identification.

The technical solution of embodiments of the present disclosure can determine, in accordance with a collection of to-be-processed speech information, a to-be-processed acoustic feature corresponding to the to-be-processed speech information; after the acoustic features are input into a decoder and/or a keyword detection system corresponding to the target text, the to-be-matched text corresponding to the to-be-processed acoustic feature can be obtained. At the same time, the utterance of the to-be-matched text in the target text can be determined, which solves the problem that the teleprompter in the related technology only plays a role in displaying the broadcast text, and is unable to effectively prompt the broadcast user, resulting in poor prompting effect. It has implemented that in the process of broadcasting by the target user, the speech information of the broadcast user is collected, and the target utterance corresponding to the speech information in the broadcast text is determined, and the display is differentiated on the teleprompter, so as to achieve the technical effect that the teleprompter can intelligently follow the broadcast user and thus improve the broadcast effect.

The plurality of units and modules comprised in the above apparatus are only divided according to the functional logic, but are not limited to the above division, as long as they can implement the corresponding functions; in addition, the names of the plurality of functional units are only for the purpose of facilitating the distinction between each other, and are not used to limit the scope of protection of the embodiments of the present disclosure.

Embodiment 4

Figure 4:
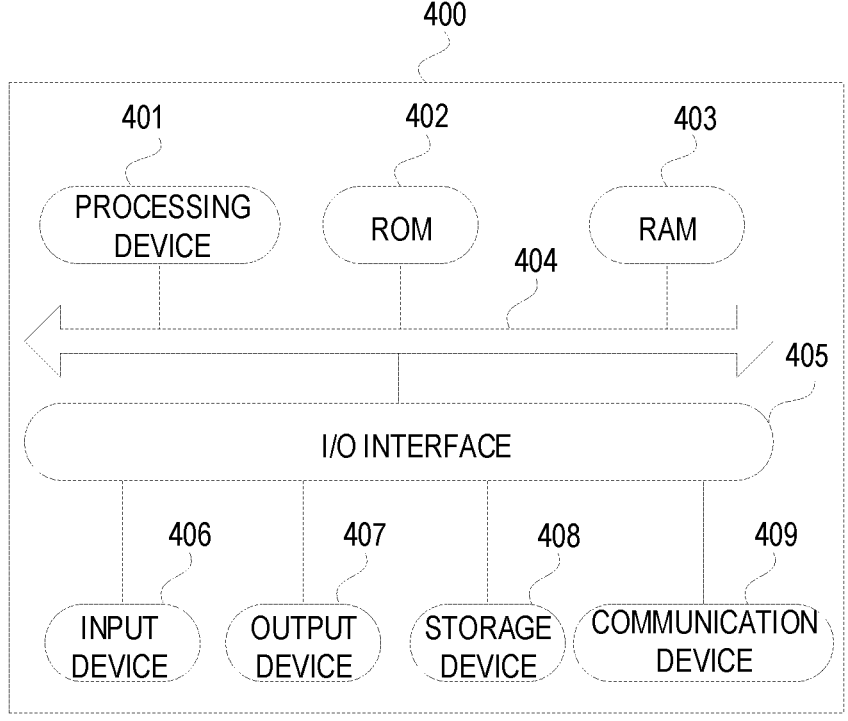
FIG. 4 is a structural schematic diagram of an electronic device provided by embodiment 4 of the present disclosure.

FIG. 4 is a structural schematic diagram of an electronic device provided by embodiment 4 of the present disclosure. Referring to FIG. 4 below, it shows a structural schematic diagram of an electronic device (such as a terminal device or server in FIG. 4) 400 suitable for implementing the embodiments of the present disclosure. The terminal device 400 in the embodiments of the present disclosure may comprise, but is not limited to a cell phone, a laptop computer, a digital broadcast receiver, a Personal Digital Assistant (PDA), a Portable Android Device (PAD), a Portable Media Player (PMP), an in-vehicle terminal (e.g., an in-vehicle navigation terminal), and the like, and fixed terminals such as a digital television (TV), a desktop computer, and the like. The electronic device illustrated in FIG. 4 is merely an example and should not impose any limitations on the functionality and scope of use of embodiments of the present disclosure.

As shown in FIG. 4, the electronic device 400 may comprise a processing device (e.g., a central processor, a graphics processor, etc.) 401, which may perform a variety of appropriate actions and processes based on a program stored in Read-Only Memory (ROM) 402 or loaded from the storage device 408 into Random Access Memory (RAM) 403 to perform various appropriate actions and processes. Various programs and data required for operation of the electronic device 400 are also stored in the RAM 403. The processing device 401, the ROM 402, and the RAM 403 are connected to respective other via the bus 404. An input/output (I/O) interface 405 is also connected to bus 404.

Generally, the following devices may be connected to the I/O interface 405: an input device 406 comprising, for example, a touch screen, a touch pad, a keyboard, a mouse, a video camera, a microphone, an accelerometer, a gyroscope, and the like; an output device 407 comprising, for example, a liquid crystal display (LCD), a speaker, a vibrator, and the like; a storage device 408 comprising, for example, a magnetic tape, a hard disk, and the like; and a communication device 409. The communication device 409 may allow the electronic device 400 to communicate wirelessly or wiredly with other devices to exchange data. Although FIG. 4 illustrates electronic device 400 with various devices, it should be understood that it is not required to implement or have all of the illustrated devices. More or fewer devices may alternatively be implemented or possessed.

According to the embodiments of the present disclosure, the process described with reference to the flowchart above may be implemented as a computer software program. For example, embodiments of the present disclosure comprise a computer program product comprising a computer program anchored on a non-transitory computer-readable medium, the computer program comprising program code for executing the method shown in the flowchart. In such embodiments, the computer program may be downloaded and installed from a network via the communication device 409, or from the storage device 408, or from the ROM 402. When the computer program is executed by the processing device 401, the above functions defined in the method of the embodiments of the present disclosure are performed.

The names of messages or information exchanged between the plurality of devices in the present disclosure are for illustrative purposes only and are not intended to limit the scope of these messages or information.

Embodiment of the present disclosure provides an electronic device and the method of text content matching provided in the above embodiments belong to the same concept, technical details not described in detail in the present embodiment may refer to the above embodiment, and the present embodiment has the same effect as the above embodiment.

Embodiment 5

Embodiments of the present disclosure provides a computer storage medium comprising computer instructions thereon, the instructions, when executed by a processor, implements the method of text content matching according to the above embodiments.

The computer-readable medium described above in the present disclosure may be a computer-readable signal medium or a computer-readable storage medium or any combination thereof. The computer-readable storage medium may, for example, be a system, device, or apparatus or device of electricity, magnetism, light, electromagnetism, infrared, or semiconductors, or an electrical connection of any one or more wires, or a combination of the above. The computer-readable storage medium may comprise: portable computer disk, hard disk, random access memory (RAM), read-only memory (ROM), erasable programmable read-only memory (EPROM, or flash memory), optical fiber, portable compact disk read-only memory (CD-ROM), optical storage device, magnetic storage device, or any suitable combination of the foregoing. For purposes of the present disclosure, a computer-readable storage medium may be any tangible medium that contains or stores a program that may be used by or in combination with an instruction execution system, apparatus, or component. And in the present disclosure, a computer-readable signal medium may comprise a data signal propagated in a baseband or as part of a carrier carrying computer-readable program code. Such propagated data signals may take a variety of forms, comprising electromagnetic signals, optical signals, or any suitable combination of the foregoing. The computer-readable signal medium may also be any computer-readable medium other than a computer-readable storage medium that sends, disseminates, or transmits a program for use by, or in conjunction with, an instruction-executing system, apparatus, or component. The program code contained on the computer-readable medium may be transmitted using any suitable medium, comprising: wire, fiber optic cable, radio frequency (RF), etc., or any suitable combination thereof.

In some implementations, clients, servers may communicate with any currently known or future developed network protocol such as HyperText Transfer Protocol (HTTP) and may be interconnected with any form or medium of digital data communication (e.g., a communications network). Examples of communication networks comprise Local Area Networks (LAN), Wide Area Networks (WAN), Internet (e.g., the Internet), and End-to-End Networks (e.g., ad hoc End-to-End Networks), as well as any currently known or future developed networks.

The computer-readable medium may be included in the above-mentioned electronic device; it may also exist separately and not be assembled into the electronic device.

The computer-readable medium carries one or more programs that, when the one or more programs are executed by the electronic device, enable the electronic device: extracting profile information of a first instance in a template material, wherein the template material comprises the first instance and a instance background; obtaining a dueting material imported by a user based on the profile information, wherein the dueting material comprises a second instance corresponding to the first instance; and adding the second instance into a region corresponding to the first instance in the template material to obtain a duet result, wherein the duet result comprises the second instance and the instance background.

Computer program code for performing the operations of the present disclosure may be written in one or more programming languages, or combinations thereof, including object-oriented programming languages such as Java, Smalltalk, C++, conventional procedural programming languages such as the "C" language, or similar programming languages, or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer over any kind of network, including a LAN or WAN, or it may be connected to an external computer (e.g., via an Internet connection using an Internet service provider).

The flowcharts and block diagrams in the accompanying drawings illustrate the architecture, functionality, and operation of systems, methods, and computer program products that may be implemented in accordance with various embodiments of the present disclosure. At this point, respective box in the flowcharts or block diagrams may represent a module, program segment, or portion of code that contains one or more executable instructions for implementing a specified logical function. It should also be noted that in some implementations that are determined to be substitutions, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that respective of the boxes in the block diagrams and I or flowcharts, as well as combinations of the boxes in the block diagrams and I or flowcharts, may be implemented in a dedicated hardware-based system that performs the specified function or operation, or may be implemented in a combination of dedicated hardware and computer instructions.

Units described as being involved in embodiments of the present disclosure may be implemented by way of software or may be implemented by way of hardware. Wherein the name of a unit does not in some cases constitute a limitation of the unit itself, for example, a first obtaining unit may also be described as "a unit for obtaining at least two Internet Protocol addresses".

The functions described above herein may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), and System on Chip (SOC). Application Specific Standard Parts (ASSP), System on Chip (SOC), Complex Programmable Logic Device (CPLD) and so on.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise an electronic, magnetic, optical, electromagnetic, infrared, or semiconductor system, device, or apparatus, or any suitable combination thereof. Machine-readable storage media may comprise an electrical connection based on one or more wires, a portable computer disk, a hard disk, a random-access memory (RAM), a read-only memory (ROM), an erasable programmable read-only memory (EPROM or flash memory), a fiber optic, a compact compact disk-read-only memory (CD- ROM) for convenience, an optical storage device, a magnetic storage device, or any suitable combination of the foregoing, or any suitable combination thereof.

According to one or more embodiments of the present disclosure, [Example 1] provides a method of text content matching, the method comprising:

in accordance with a collection of to-be-processed speech information, determining a to-be-processed acoustic feature corresponding to the to-be-processed speech information;

processing, based on an audio following method, the to-be-processed acoustic feature to obtain a to-be-matched utterance corresponding to the to-be-processed acoustic feature; and determining a target utterance associated with the to-be-matched utterance in target text and differentiating a display of the target utterance in the target text.

According to one or more embodiments of the present disclosure, [Example 2] provides a method of text content matching, the method comprising:

uploading the target text to determine, in accordance with the collection of the to-be-processed speech information, the target utterance associated with the to-be-matched utterance corresponding to the to-be-processed speech information in the target text.

According to one or more embodiments of the present disclosure, [Example 3] provides a method of text content matching, the method comprising:

the in accordance with a collection of to-be-processed speech information, determining a to-be-processed acoustic feature corresponding to the to-be-processed speech information comprising:

in accordance with a determination that a user interacts based on a real-time interactive interface, collecting to-be-processed speech information of a target user; and performing, based on an audio feature extraction algorithm, feature extraction on the to-be-processed speech information, and obtaining a to-be-processed acoustic feature corresponding to the to-be-processed speech information.

According to one or more embodiments of the present disclosure, [Example 4] provides a method of text content matching, the method comprising:

the processing, based on an audio following method, the to-be-processed acoustic feature to obtain a to-be-matched utterance corresponding to the to-be-processed acoustic feature comprising:

processing the to-be-processed acoustic feature based on an acoustic model in the audio following method, to obtain an acoustic posterior probability corresponding to the to-be-processed acoustic feature;

determining, based on the acoustic posterior probability and a decoder corresponding to the target text in the audio following method, a first to-be-determined utterance corresponding to the to-be-processed acoustic feature and a first confidence corresponding to the first to-be-determined utterance; wherein the decoder is determined based on an interpolation language model corresponding to the target text, and the interpolation language model is determined based on a target language model and an ordinary language model corresponding to the target text; and in accordance with a determination that the first confidence satisfies a predetermined confidence threshold, determining the first to-be-determined utterance as the to-be-matched utterance.

According to one or more embodiments of the present disclosure, [Example 5] provides a method of text content matching, the method comprising:

the processing, based on an audio following method, the to-be-processed acoustic feature to obtain a to-be-matched utterance corresponding to the to-be-processed acoustic feature comprising:

determining, based on a keyword detection system and the to-be-processed acoustic feature in the audio following method, a second to-be-determined utterance corresponding to the to-be-processed acoustic feature and a second confidence corresponding to the second to-be-determined utterance; wherein the keyword detection system matches the target text; and in accordance with a determination that the second confidence satisfies a predetermined confidence threshold, determining the second to-be-determined utterance as the to-be-matched utterance.

According to one or more embodiments of the present disclosure, [Example 6] provides a method of text content matching, the method comprising:

the processing, based on an audio following method, the to-be-processed acoustic feature to obtain a to-be-matched utterance corresponding to the to-be-processed acoustic feature comprising:

the audio following method comprising a keyword detection system and a decoder, and processing the to-be-processed acoustic feature based on the decoder and the keyword detection system, respectively, and in accordance with a determination that a first to-be-determined utterance and a second to-be-determined utterance are obtained, determining the to-be-matched utterance based on a first confidence of the first to-be-determined utterance and a second confidence of the second to-be-determined utterance.

According to one or more embodiments of the present disclosure, [Example 7] provides a method of text content matching, the method comprising:

determining a decoder corresponding to the target text;

the determining a decoder corresponding to the target text comprising:

obtaining the target text and performing word-splitting on the target text to obtain at least one broadcast vocabulary corresponding to the target text;

obtaining a target language model based on the at least one broadcast vocabulary;

determining an interpolation language model based on the target language model and the ordinary language model; and obtaining a decoder corresponding to the target text by dynamically composing the interpolation language model through a weighted finite state conversion machine.

According to one or more embodiments of the present disclosure, [Example 8] provides a method of text content matching, the method comprising:

dividing the target text into at least one broadcast vocabulary;

determining a category corresponding to the at least one broadcast vocabulary based on a predetermined categorization rule; and generating the keyword detection system based on the broadcast vocabularies corresponding to the respective category.

According to one or more embodiments of the present disclosure, [Example 9] provides a method of text content matching, the method comprising:

the differentiating a display of the target utterance in the target text comprising:

highlighting the target utterance; or, displaying the target utterance in bold; or, displaying utterances in the target text other than the target utterance in a semi-transparent form; wherein transparency of a predetermined number of unmatched utterances adjacent to the target utterance is lower than transparency of other unmatched utterances.

According to one or more embodiments of the present disclosure, [Example 10] provides a method of text content matching, the method comprising:

the determining a target utterance corresponding to the to-be-matched text in the target text, comprising:

if the target text at a current moment comprises a differentially displayed read utterance, determining a target utterance associated with the to-be-matched text in the target text with the read text as a starting point.

According to one or more embodiments of the present disclosure, [Example 11] provides a method of text content matching, the method comprising:

the determining a target utterance associated with the to-be-matched utterance in the target text with the read utterance as a starting point comprising:

determining the read utterance as a starting point, and determining a predetermined number of to-be-aligned un-broadcasted utterances after the starting point;

if there is an utterance in the to-be-aligned un-broadcasted utterance that is consistent with the to-be-matched utterance, determing the utterance that is consistent with the to-be-matched utterance as the target utterance.

According to one or more embodiments of the present disclosure, [Example 12] provides a method of text content matching, the method comprising:

determining an actual speech duration corresponding to the target utterance;

adjusting a predicted speech duration corresponding to an unmatched utterance based on the actual speech duration and the unmatched utterance in the target text; and displaying the predicted speech duration on a target client as a prompt to the target user.

According to one or more embodiments of the present disclosure, [Example 13] provides a method of text content matching, the method comprising:

in accordance with a reception of the target text, performing utterance-segmentation marking on the target text, and displaying an utterance-segmentation marking identification on a client, to cause a user to read the target text based on the utterance-segmentation marking identification.

According to one or more embodiments of the present disclosure, [Example 14] provides a method of text content matching, the method comprising:

in accordance with a reception of the target text, performing emotion marking on respective utterance in the target text, and displaying an emotion marking identification on a client, to cause a user to read the target text based on the emotional marking identification.

According to one or more embodiments of the present disclosure, [Example 15] provides an apparatus for text content matching, the apparatus comprising:

an acoustic feature determination module configured to, in accordance with a collection of to-be-processed speech information, determine a to-be-processed acoustic feature corresponding to the to-be-processed speech information;

a to-be-matched text determination module configured to process, based on an audio following method, the to-be-processed acoustic feature to obtain a to-be-matched utterance corresponding to the to-be-processed acoustic feature; and a differentiating displaying module configured to determine a target utterance associated with the to-be-matched utterance in target text and differentiating a display of the target utterance in the target text.

Furthermore, although a plurality of operations is depicted in a particular order, this should not be construed as requiring that the operations be performed in the particular order shown or in sequential order of performance. In certain environments, multitasking and parallel processing may be advantageous. Similarly, while a plurality of implementation details is included in the above discussion, these should not be construed as limiting the scope of the present disclosure. Some of the features described in the context of separate embodiments may also be implemented in combination in a single embodiment. Conversely, a plurality of features described in the context of a single embodiment may also be implemented in a plurality of embodiments, either individually or in any suitable sub-combination.

I claim:

1. A method of text content matching, comprising:

in accordance with a collection of speech information, determining an acoustic feature corresponding to the speech information;

processing, based on an audio following method, the to be processed acoustic feature to obtain an utterance corresponding to the acoustic feature, wherein the processing the acoustic feature to obtain the utterance corresponding to the acoustic feature comprises:

processing the acoustic feature based on an acoustic model in the audio following method to obtain an acoustic posterior probability corresponding to the acoustic feature, determining, based on the acoustic posterior probability and a decoder corresponding to text in the audio following method, a first utterance corresponding to the acoustic feature and a first confidence corresponding to the first utterance, wherein the decoder is determined based on an interpolation language model corresponding to the text, and the interpolation language model is determined based on a target language model and an ordinary language model corresponding to the text, and in accordance with a determination that the first confidence satisfies a predetermined confidence threshold, determining the first utterance as the utterance; and determining a target utterance associated with the utterance in the text and differentiating a display of the target utterance in the text.

2. The method of claim 1, further comprising:

uploading the text to determine, in accordance with the collection of the speech information, the target utterance associated with the utterance corresponding to the speech information in the text.

3. The method of claim 1, wherein the in accordance with a collection of speech information, determining an acoustic feature corresponding to the speech information comprises:

in accordance with a determination that a user interacts based on a real-time interactive interface, collecting speech information of a target user; and performing, based on an audio feature extraction algorithm, feature extraction on the speech information, and obtaining the acoustic feature corresponding to the speech information.

4. The method of claim 1, wherein the processing, based on an audio following method, the acoustic feature to obtain an utterance corresponding to the acoustic feature comprises:

determining, based on a keyword detection system and the acoustic feature in the audio following method, a second utterance corresponding to the acoustic feature and a second confidence corresponding to the second utterance; wherein the keyword detection system matches the text; and in accordance with a determination that the second confidence satisfies a predetermined confidence threshold, determining the second utterance as the utterance.

5. The method of claim 1, wherein the audio following method comprises a keyword detection system and a decoder and the processing, based on an audio following method, the acoustic feature to obtain an utterance corresponding to the acoustic feature comprises:

processing the acoustic feature based on the decoder and the keyword detection system, respectively, and in accordance with a determination that the first utterance and a second utterance are obtained, determining the utterance based on a first confidence of the first utterance and a second confidence of the second utterance.

6. The method of claim 1, wherein the differentiating a display of the target utterance in the text comprises:

highlighting the target utterance; or, displaying the target utterance in bold; or, displaying utterances in the target text other than the target utterance in a semi-transparent form; wherein transparency of a predetermined number of unmatched utterances adjacent to the target utterance is lower than transparency of other unmatched utterances.

7. The method of claim 1, wherein during the determining of the target utterance, the method further comprises:

determining an actual speech duration corresponding to the target utterance;

adjusting a predicted speech duration corresponding to an unmatched utterance based on the actual speech duration and the unmatched utterance in the text; and displaying the predicted speech duration on a target client as a prompt to the target user.

8. The method of claim 1, further comprising:

in accordance with a reception of the text, performing utterance-segmentation marking on the text, and displaying an utterance-segmentation marking identification on a client, to cause a user to read the text based on the utterance-segmentation marking identification.

9. The method of claim 1, further comprising:

in accordance with a reception of the text, performing emotion marking on respective utterance in the text, and displaying an emotion marking identification on a client, to cause a user to read the text based on the emotional marking identification.

10. An electronic device comprising:

at least one processor; and a storage device configured to store at least one program; wherein the at least one program, when executed by the at least one processor, causes the at least one processor to implement operations comprising:

in accordance with a collection of speech information, determining an acoustic feature corresponding to the speech information;

processing, based on an audio following method, the acoustic feature to obtain an utterance corresponding to the acoustic feature, wherein the processing the acoustic feature to obtain the utterance corresponding to the acoustic feature comprises:

processing the acoustic feature based on an acoustic model in the audio following method to obtain an acoustic posterior probability corresponding to the acoustic feature, determining, based on the acoustic posterior probability and a decoder corresponding to the text in the audio following method, a first utterance corresponding to the acoustic feature and a first confidence corresponding to the first utterance; wherein the decoder is determined based on an interpolation language model corresponding to the text, and the interpolation language model is determined based on a target language model and an ordinary language model corresponding to the text, and in accordance with a determination that the first confidence satisfies a predetermined confidence threshold, determining the first utterance as the utterance; and determining a target utterance associated with the utterance in text and differentiating a display of the target utterance in the text.

11. The electronic device of claim 10, wherein the operations further comprise:

uploading the text to determine, in accordance with the collection of the speech information, the target utterance associated with the utterance corresponding to the speech information in the text.

12. The electronic device of claim 10, wherein the in accordance with a collection of speech information, determining an acoustic feature corresponding to the speech information comprises:

in accordance with a determination that a user interacts based on a real-time interactive interface, collecting speech information of a target user; and performing, based on an audio feature extraction algorithm, feature extraction on the speech information, and obtaining the acoustic feature corresponding to the speech information.

13. The electronic device of claim 10, wherein the processing, based on an audio following method, the acoustic feature to obtain an utterance corresponding to the acoustic feature comprises:

determining, based on a keyword detection system and the acoustic feature in the audio following method, a second utterance corresponding to the acoustic feature and a second confidence corresponding to the second utterance; wherein the keyword detection system matches the text; and in accordance with a determination that the second confidence satisfies a predetermined confidence threshold, determining the second utterance as the utterance.

14. The electronic device of claim 10, wherein the audio following method comprises a keyword detection system and a decoder and the processing, based on an audio following method, the acoustic feature to obtain an utterance corresponding to the acoustic feature comprises:

processing the acoustic feature based on the decoder and the keyword detection system, respectively, and in accordance with a determination that the first utterance and a second utterance are obtained, determining the utterance based on a first confidence of the first utterance and a second confidence of the second utterance.

15. The electronic device of claim 10, wherein the differentiating a display of the target utterance in the text comprises:

highlighting the target utterance; or, displaying the target utterance in bold; or, displaying utterances in the text other than the target utterance in a semi-transparent form; wherein transparency of a predetermined number of unmatched utterances adjacent to the target utterance is lower than transparency of other unmatched utterances.

16. The electronic device of claim 10, wherein during the determining of the target utterance, the operations further comprise:

determining an actual speech duration corresponding to the target utterance;

adjusting a predicted speech duration corresponding to an unmatched utterance based on the actual speech duration and the unmatched utterance in the text; and displaying the predicted speech duration on a target client as a prompt to the target user.

17. The electronic device of claim 10, wherein the operations further comprise:

in accordance with a reception of the text, performing utterance-segmentation marking on the text, and displaying an utterance-segmentation marking identification on a client, to cause a user to read the text based on the utterance-segmentation marking identification.

18. A non-transitory storage medium comprising computer-executable instructions, the computer-executable instructions, when executed by a processor, cause the processor to perform operations comprising:

in accordance with a collection of speech information, determining an acoustic feature corresponding to the speech information;

processing, based on an audio following method, the acoustic feature to obtain an utterance corresponding to the acoustic feature, wherein the processing the acoustic feature to obtain the utterance corresponding to the acoustic feature comprises:

processing the acoustic feature based on an acoustic model in the audio following method to obtain an acoustic posterior probability corresponding to the acoustic feature, determining, based on the acoustic posterior probability and a decoder corresponding to the text in the audio following method, a first utterance corresponding to the acoustic feature and a first confidence corresponding to the first utterance; wherein the decoder is determined based on an interpolation language model corresponding to the text, and the interpolation language model is determined based on a target language model and an ordinary language model corresponding to the text, and in accordance with a determination that the first confidence satisfies a predetermined confidence threshold, determining the first utterance as the utterance; and determining a target utterance associated with the utterance in text and differentiating a display of the target utterance in the text.

19. The non-transitory storage medium of claim 18, the operations further comprising:

determining an actual speech duration corresponding to the target utterance;

adjusting a predicted speech duration corresponding to an unmatched utterance based on the actual speech duration and the unmatched utterance in the text; and displaying the predicted speech duration as a prompt to a user.

20. The non-transitory storage medium of claim 18, the operations further comprising:

performing emotion marking on respective utterance in the text; and displaying an emotion marking identification to cause a user to read the respective utterance in text based on the emotional marking identification.

\* \* \* \* \*